United States Patent
Traut et al.

(10) Patent No.: US 9,751,372 B2
(45) Date of Patent: Sep. 5, 2017

(54) SYSTEM FOR DETERMINING AN AXLE LOAD FOR AN AGRICULTURAL TRACTOR

(71) Applicant: DEERE & COMPANY, Moline, IL (US)

(72) Inventors: Sebastian Traut, Kaiserslautern (DE); Guenther Wolf, Worms (DE); Michael Meid, Waghaeusel (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/066,041

(22) Filed: Mar. 10, 2016

(65) Prior Publication Data
US 2016/0297275 A1    Oct. 13, 2016

(30) Foreign Application Priority Data
Apr. 9, 2015    (DE) .................. 10 2015 206 369

(51) Int. Cl.
*B60G 17/016*    (2006.01)
*B60G 17/018*    (2006.01)
(Continued)

(52) U.S. Cl.
CPC ......... *B60G 17/016* (2013.01); *B60G 17/018* (2013.01); *B60G 17/019* (2013.01);
(Continued)

(58) Field of Classification Search
CPC ...... B60Q 9/00; B60G 17/019; B60G 17/016; B60G 17/01941; B60G 17/0195;
(Continued)

(56) References Cited

U.S. PATENT DOCUMENTS 4,706,445 A * 11/1987 Woolsey ................. A01F 15/08
180/11
5,255,756 A * 10/1993 Follmer ............... A01B 69/004
172/6
(Continued)

FOREIGN PATENT DOCUMENTS

DE          10029332 B4    1/2002
DE       102005051964 A1    5/2007
(Continued)

OTHER PUBLICATIONS

European Search Report in foreign counterpart application No. 16163907.5 dated Aug. 25, 2016 (7 pages).
(Continued)

*Primary Examiner* — McDieunel Marc
(74) *Attorney, Agent, or Firm* — Taft Stettinius & Hollister LLP; Stephen F. Rost

(57) ABSTRACT

A system for determining an axle load for an agricultural tractor. The system includes an axle or wheel suspension device arranged on a front axle of the agricultural tractor and has a hydraulic spring strut having a hydraulic cylinder and a hydraulic piston dividing the hydraulic cylinder into an annular space and a piston space. A first pressure sensor detects a first working pressure, which is present in the annular space. A second pressure sensor detects a second working pressure, which is present in the piston space. A control device calculates a front axle load variable which represents an axle load acting on a front axle on the basis of a pressure force difference derived from the first and second working pressures.

14 Claims, 2 Drawing Sheets

(51) Int. Cl.
    *B60G 17/019* (2006.01)
    *B60G 17/0195* (2006.01)
    *B60Q 9/00* (2006.01)

(52) U.S. Cl.
    CPC ... *B60G 17/0195* (2013.01); *B60G 17/01941* (2013.01); *B60Q 9/00* (2013.01); *B60G 2300/08* (2013.01); *B60G 2300/082* (2013.01); *B60G 2400/51* (2013.01); *B60G 2400/5182* (2013.01); *B60G 2400/60* (2013.01); *B60G 2600/042* (2013.01); *B60G 2600/044* (2013.01); *B60G 2800/70* (2013.01)

(58) Field of Classification Search
    CPC .......... B60G 2300/082; B60G 2400/51; B60G 2400/60; B60G 2600/042; B60G 2600/044; B60G 2800/70; B62D 55/112; B60P 1/00; A01B 69/004; A01F 15/08; G60G 2300/08
    USPC ...................................... 701/37; 180/9.54, 11
    See application file for complete search history.

(56) References Cited

U.S. PATENT DOCUMENTS

| | | | |
|---|---|---|---|
| 2004/0019471 | A1* | 1/2004 | Bush ................. B60P 1/00 703/6 |
| 2016/0023695 | A1* | 1/2016 | Obermeier-Hartmann B62D 55/112 180/9.54 |

FOREIGN PATENT DOCUMENTS

| | | |
|---|---|---|
| DE | 102005062246 A1 | 7/2007 |
| DE | 102006051894 A1 | 5/2008 |
| EP | 1167094 A1 | 1/2002 |
| EP | 1918136 A1 | 5/2008 |
| EP | 2269432 A1 | 1/2011 |
| WO | 2013013917 A1 | 1/2013 |

OTHER PUBLICATIONS

German Search Report in foreign counterpart application No. 102015206369.0 dated Dec. 8, 2015 (10 pages).

\* cited by examiner

SYSTEM FOR DETERMINING AN AXLE LOAD FOR AN AGRICULTURAL TRACTOR

RELATED APPLICATION

This application claims priority to German Application Ser. No. DE 102015206369.0, filed on Apr. 9, 2015, which is hereby expressly incorporated by reference in its entirety.

FIELD OF THE DISCLOSURE

The present disclosure relates a system for determining an axle load for an agricultural tractor.

BACKGROUND

Agricultural tractors are increasingly being equipped with suspended front axles. Thus John Deere offers, under the name "TLS" (Triple Link Suspension), a hydraulically sprung floating axle, which is pivotably suspended by a trailing arm on a chassis of the agricultural tractor and which is supported on the chassis of the agricultural tractor by means of two hydraulic struts opposing one another in the transverse direction. Each of the two hydraulic struts has a hydraulic cylinder and a hydraulic piston that subdivides the hydraulic cylinder into an annular space and a piston space. A hydraulic controller connected to the two hydraulic struts makes it possible to regulate the level of the chassis of the agricultural tractor in relation to the ground by appropriate application of pressure to the piston spaces. In addition, a plurality of diaphragm accumulators communicating with the hydraulic struts are used to implement a spring function, wherein the spring stiffness of the hydraulic struts can be varied by the hydraulic controller by applying appropriate pressure to the annular spaces. The extent of the pressure application is monitored by means of a pressure sensor that communicates with the annular spaces.

The varying pressure conditions as a result of the hydraulic level or spring stiffness regulation complicate an assessment, by means of the pressure sensor, of the axle load acting on the front axle. Exact knowledge of this load is necessary, however, for purposes of an adaptive control of the running gear or for automatically operating a central tire inflation pressure system for the agricultural tractor.

SUMMARY

The present disclosure provides a system, adapted for use with hydraulic level regulation or a spring stiffness regulation, for determining an axle load of an agricultural tractor.

The system for determining the axle load for an agricultural tractor includes an axle or wheel suspension device, which is arranged on a front axle of an agricultural tractor. The system includes a hydraulic spring strut having a hydraulic cylinder and a hydraulic piston dividing the hydraulic cylinder into an annular space and a piston space. A first pressure sensor is provided in order to detect a first working pressure, which is present in the annular space, and a second pressure sensor is provided in order to detect a second working pressure, which is present in the piston space. On the basis of a pressure force difference derived from the first and second working pressures, a control device calculates a front axle load variable, which represents an axle load acting on the front axle.

Influences from a hydraulic level regulation can be eliminated from the start due to the derived pressure force difference, since a change of the first working pressure in the annular space by displacement of the hydraulic piston inside the hydraulic cylinder leads to a change of the same kind for the second working pressure in the piston space.

The front axle load variable calculated in this manner can provide information regarding both the static axle load and the dynamic behavior thereof. The front axle load variable serves in the latter case as a control variable for controlling an adaptive suspension, for example, for detecting and actively damping operation-related pitching vibrations of the agricultural tractor chassis relative to the ground. Information regarding the static axle load, on the other hand, can be used for automatically controlling a central tire-inflation pressure system of the agricultural tractor. The system provides a load-compensated adjustment of the tire contact surface for the front axle by appropriately adjusting the inflation pressure of the front tires.

The front axle, in one embodiment, is pivotably suspended by a trailing arm from the chassis of the agricultural tractor, wherein the control device takes a lever length specific for the trailing arm into account in the calculation of the front axle load variable. The front axle can be a floating axle arranged at a free end of the trailing arm and supported on the chassis of the agricultural tractor by means of two hydraulic struts opposing one another in the transverse direction. The specific lever length of the trailing arm results from the distance between a suspension point on the chassis and the center of the axle. The front axle load is calculated, in such a case, in relation to the axle, but if the wheels are independently suspended, the calculation can be done for each individual wheel.

The calculated front axle load variable can be used to detect overloading or underloading of the front axle of the agricultural tractor and to prompt the driver to take appropriate countermeasures, such as reducing the driving speed. Underloading of the front axle typically occurs due to a vertically towed load acting in the rear area of the agricultural tractor. Overloading typically occurs when front-attached implements or weights are mounted. In one embodiment, the control device is configured to compare the calculated front axle load variable to a permissible operating value range. The control device outputs corresponding information for the driver in the event of a deviation from the permissible operating value range. The permissible operating value range results model dependently from the specifications of the respective agricultural tractor.

In more precise terms, the control device can trigger the output of user information by a user interface, which can output an acoustic or visual warning signal indicating overloading or underloading of the front axle. In this or in other embodiments, the warning includes a corresponding information text. In one embodiment, the user interface is constructed as an acoustic signal generator or a signal lamp installed in the area of a control console in the agricultural tractor. The user interface can also be a graphical user interface (GUI), which displays a wealth of additional operating information about the agricultural tractor on a touch-sensitive display.

It is additionally possible for the control device to calculate a rear axle load variable, representing an axle load acting on a rear axle, by proceeding from a force effect appearing at a rear-end lifting mechanism due to a towed load. The rear lifting mechanism, for example, may be designed as a three-point implement hitch for attaching an agricultural implement. The three-point implement hitch includes two lower links pivotably mounted at opposing lower articulation points, and a top link pivotably mounted at a central upper articulation point. The lower links can be raised or lowered by means of hydraulic lifting cylinders by associated lifting spindles.

Calculation of the rear axle load variable requires knowledge of the position of the center of gravity of the attached towed load and of the weight thereof. Knowledge of the position of the center of gravity can include information regarding the force or lever conditions prevailing at the three-point implement hitch. The force conditions can be estimated by using force measuring pins in the articulation points of the lower links or the upper link. Force conditions can also be determined by pressure sensors for detecting a working pressure prevailing in the hydraulic lifting cylinders. The lever conditions, on the other hand, cannot be readily determined, due to the multiple adjustment possibilities of the three-point implement hitch, so that an empirical value covering the most common settings is used as the basis for calculating the rear axle load variable.

The static rear axle load, which can be derived from the calculated rear axle load variable, can be used together with that of the front axle for automatically controlling a central tire inflation system of the agricultural tractor. This makes it possible to undertake a load-compensated adjustment of the tire contact surface on both axles of the agricultural tractor by appropriately adjusting the inflation pressure of the front and rear tires.

The control device, depending on the calculated front axle load variable in conjunction with the calculated rear axle load variable, can determine a center of gravity position oriented in the longitudinal direction of the agricultural tractor. The determined center of gravity position allows the detection of a front-heavy or rear-heavy driving behavior of the agricultural tractor, wherein the driver can be prompted by an associated user interface to provide counter-ballasting by mounting a front or rear counterweight.

Additionally or in the alternative, the control device can determine, on the basis of the calculated front axle load variable in conjunction with the calculated rear axle load value, a total load variable that represents the current total mass of the agricultural tractor. This takes into account, in addition to the mass of the agricultural tractor, that of an attached agricultural implement, front counterweight or the like.

On the basis of the determined total load variable, the control device can trigger a user interface, which can output driver information indicating the current total mass of the agricultural tractor. The driver information can be output by displaying the current total mass of the agricultural tractor in a country-specific measurement unit. An acoustic or visual warning indicating an overload can also be output insofar as the current total mass exceeds a value that is permissible for the agricultural tractor.

BRIEF DESCRIPTION OF THE DRAWINGS

The above-mentioned aspect of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
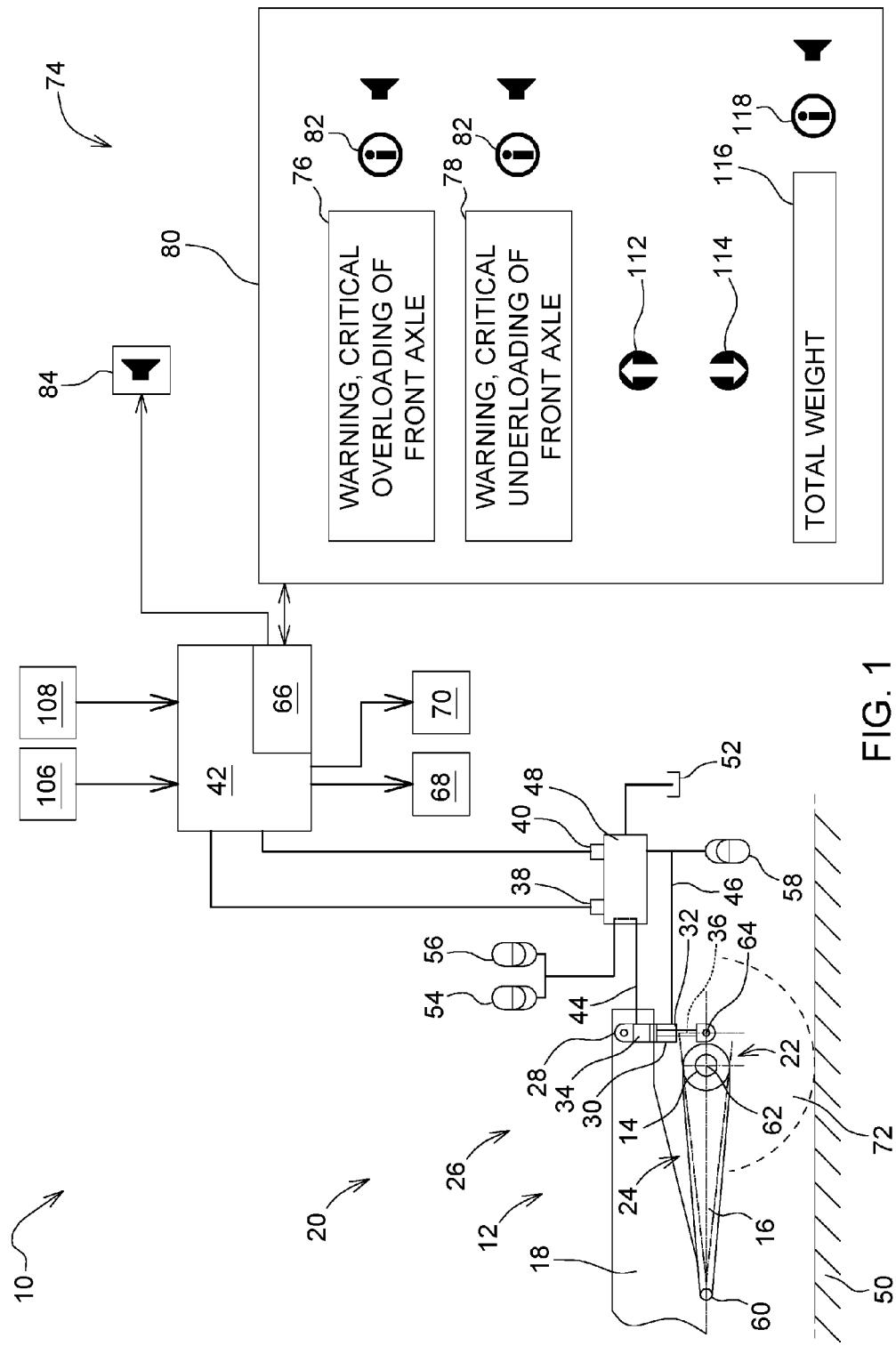
FIG. 1 is diagram of one embodiment of the system configured to determine the axle load for an agricultural tractor.

FIG. 1 shows an embodiment of a system according to the present disclosure for determining an axle load for an agricultural tractor.

The system 10 includes an axle assembly 12 having a front axle 14 that is pivotably suspended by a trailing arm 16 from a chassis 18 of the agricultural tractor 20. The front axle 14 is a floating axle 24 arranged at a free end 22 of the trailing arm 16. The front axle 14 is supported on the chassis 18 of the agricultural tractor 20 by means of two axle or wheel suspension devices 26 opposite one another in the transverse direction, wherein only one of the two axle or wheel suspension devices 26 is shown in FIG. 1 for purposes of illustration. Such a suspended front axle is offered by John Deere under the designation "TLS" (Triple Link Suspension).

Each of the axle or wheel suspension devices 26 includes a hydraulic strut 28 having a hydraulic cylinder 30 and a hydraulic piston 36 subdividing the hydraulic cylinder 30 into an annular space 32 and a piston space 34. A first pressure sensor 38 is used for detecting a first working pressure $p_1$, which is present in the annular space 32. A second pressure sensor 40 is used for detecting a second working pressure $p_2$, which is present in the piston space 34. The sensor signals provided by the two pressure sensors 38, 40 are fed to a control device 42 for calculating a front axle load variable $F_v$, which represents an axle load acting on the front axle 14.

Annular space 32 and piston space 34 are connected by associated hydraulic lines 44, 46 to a hydraulic controller 48 of the agricultural tractor 20. The hydraulic controller 48, in one embodiment, regulates the level of the chassis 18 of the agricultural tractor 20 in relation to the floating axle 24 and consequently in relation to the ground 50 by applying appropriate pressure to the piston spaces 32. In addition, a plurality of diaphragm accumulators 54, 56, 58 communicating with the hydraulic struts 28 are used to implement a spring function. The spring stiffness of the hydraulic struts 28 can be varied by the hydraulic controller 48 by applying appropriate pressure to the annular spaces 32. The extent of the pressure application is monitored by means of the first pressure sensor 38, which communicates with the annular spaces 32.

Figure 2:
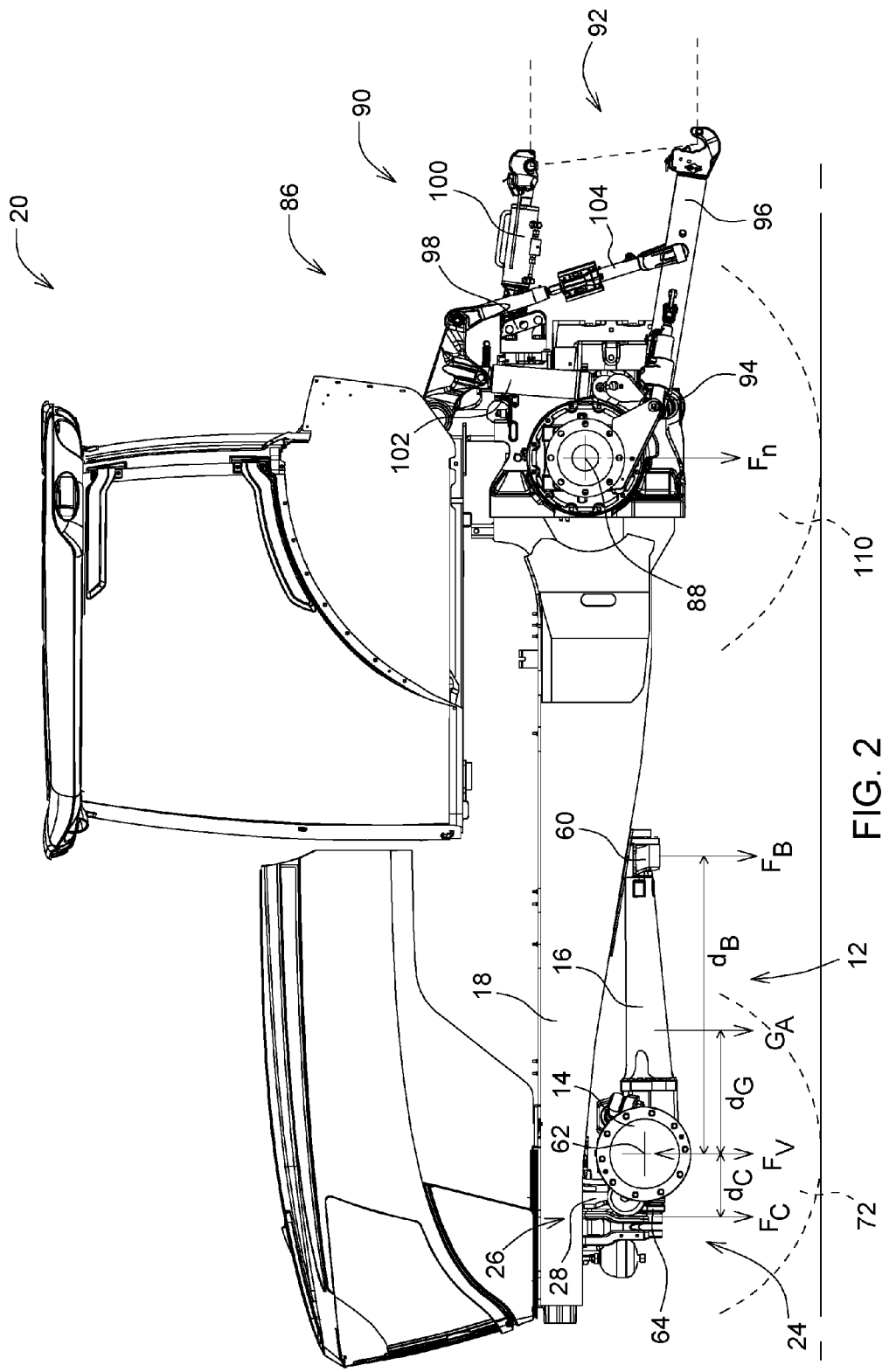
FIG. 2 is a schematic representation of the force and lever conditions used to determine the axle load for an agricultural tractor equipped with the system shown in FIG. 1.

FIG. 2 illustrates the force and lever relationships on which the determination of the axle load is based. The control device 42 derives a pressure force difference from the first and second working pressures $p_1$ and $p_2$ in order to calculate the front axle load variable $F_v$:

$$p_2 \cdot A_2 - p_1 \cdot A_1 = F_c$$

where $A_1$ and $A_2$ respectively represent the pressure-effective surface of the hydraulic piston 36 in the annular space 32 and the piston space 34. The pressure difference $F_c$ and a specific lever length $d_B$ for the trailing arm 16, the distance between a suspension point 60 of the trailing arm 16 on the chassis 18 of the agricultural tractor 20 and the center 62 of the axle, forms the basis for calculating an instantaneous equilibrium, as follows:

$$F_B \cdot d_B = F_C \cdot d_C - G_A \cdot d_G,$$

$F_B$ represents a weight-dependent bearing force acting in the suspension point 60 of the trailing arm 16. $G_A$ represents a weight force of the axle assembly 12 acting in the center of gravity of the trailing arm 16. $d_C$ represents the distance between the axle center 62 and a lower support point 64 of the axle or wheel suspension 26. $d_G$ represents the distance between the axle center 62 and the suspension point 60 of the trailing arm 16 on the chassis 18 of the agricultural tractor 20. The variables $G_A$, $d_C$ and $d_G$ are stored as fixed values in a storage unit 66 associated with the control device 42.

Simplifying by $F_B$ yields an expression for the front axle load variable $F_v$ as follows:

$$F_v = F_B + F_C + G_A.$$

The front axle load variable $F_v$, calculated in this manner, provides information regarding both the static axle load and the dynamic behavior thereof. The front axle load variable $F_v$ serves, in the latter case, as a control variable for controlling an adaptive suspension 68. For example, the control variable, in one embodiment, is for detecting and actively damping operation-related pitching vibrations of the chassis 18 of the agricultural tractor 20 relative to the ground 50 by appropriately actuating the hydraulic controller 48. Information regarding the static axle load, on the other hand, is used for automatically controlling a central tire-inflation pressure system 70 of the agricultural tractor 20. The system allows a load-compensated adjustment of the tire contact surface on the front axle 14 by appropriately adjusting the inflation pressure of the front tires 72.

Additionally or alternatively, the calculated front axle load variable $F_v$ is used to detect overloading or underloading of the front axle 14 of the agricultural tractor 20 and to prompt the driver to take appropriate countermeasures, such as reducing the driving speed. A lower load on the front axle 14 typically occurs due to a towed load acting in the rear area of the agricultural tractor 20, and a higher load typically occurs when front-attached implements or weights are mounted. Accordingly, the control device 42 compares the calculated front axle load variable $F_v$ to a permissible operating value range. The control device 42 causes corresponding information for the driver to be output in the event of a deviation from the permissible operating value range. The permissible operating value range here results model-dependently from the specifications of the agricultural tractor 20.

In more precise terms, the control device 42 triggers the output of user information by user interface 74 that is arranged in a cab of the agricultural tractor 20. The user interface 74 can output an acoustic or visual warning signal indicating overloading or underloading of the front axle 14, or a corresponding information text 76, 78. The user interface 74 is, for example, a graphical user interface (GUI) 80, which displays a variety of additional operating information about the agricultural tractor 20 on a touch-sensitive display screen. In the current case, the information text 76, 78 output, depending on the comparison result, reads "WARNING, CRITICAL OVERLOADING OF FRONT AXLE" or "WARNING, CRITICAL UNDERLOADING OF FRONT AXLE," together with the output of the visual warning signal in the form of a pictogram-like warning symbol 82. A warning sound is simultaneously generated by triggering an acoustic signal generator 84.

According to an one embodiment of the system 10, the control device 42 calculates a rear axle load variable $F_h$, representing an axle load acting on a rear axle 88 of the agricultural tractor 20, proceeding from a force effect appearing at a rear-end lifting mechanism 86 due to a towed load.

According to FIG. 2, the rear-end lifting mechanism 86 includes a three-point implement hitch 90 for attaching an agricultural implement 92 or the like. The three-point implement hitch 90 includes two lower links 96 pivotably mounted at opposing lower articulation points 94. A top link 100 is pivotably mounted at a central upper articulation point 98, wherein the lower links 96 can be raised or lowered by means of hydraulic lifting cylinders 102 by associated lifting spindles 104. Only one of the two lower links 96 is reproduced in FIG. 2 for illustration reasons.

Calculation of the rear axle load variable $F_h$ requires knowledge of the position of the center of gravity of the attached towed load and of the weight thereof, that is to say, information regarding the force or lever conditions prevailing at the three-point implement hitch 90. For example, the control device 42 estimates the force conditions on the basis of sensor signals that are provided by force measuring pins 106 in the articulation points 94, 98 of the lower links 96 or the upper link 100, and by pressure sensors 108 for detecting a working pressure present in the hydraulic lifting cylinders 102 (FIG. 1). The lever conditions, on the other hand, are not readily determined, due to the multiple adjustment possibilities of the three-point implement hitch 90, so that an empirical value covering the most common settings is used, in one embodiment, as the basis for calculating the rear axle load variable $F_h$.

The static axle load, which can be derived from the calculated rear axle load variable $F_h$, can be used together with that of the front axle 14 for automatically controlling the central tire inflation system 70 of the agricultural tractor 20. This makes it possible to undertake a load-compensated adjustment of the tire contact surface at both axles 14, 88 of the agricultural tractor 20 by appropriately adjusting the inflation pressure of the front and rear tires 72, 110.

The control device 42 additionally determines, on the basis of the calculated front axle load variable $F_C$ in conjunction with the calculated rear axle load variable $F_h$, a center of gravity point oriented in the longitudinal direction of the agricultural tractor 20. More particularly, the center of gravity point is determined according to $$l_h = (F_V \cdot l)/(F_V + F_h)$$

wherein $l_h$ represents the distance of the center of gravity from the rear axle 88 and l represents the distance between the front axle 14 and the rear axle 88 (not shown in FIG. 2 for the sake of clarity).

The determined center of gravity position allows detection of expected front-heavy or rear-heavy driving behavior of the agricultural tractor 20. This information is indicated, for example, by displaying pictogram-like information symbols 112, 114 on the graphical user interface 80. The driver is prompted by the user interface 74 to provide counter-ballasting by attaching corresponding front or rear counterweights.

In addition, the control device 42 determines a total load variable $F_g$, which represents the current total mass of the agricultural tractor 20, on the basis of the calculated front axle load variable $F_v$ in conjunction with the calculated rear axle load variable $F_h$. The control device 42 triggers the user interface 74 to output driver information indicating the current total mass of the agricultural tractor 20 in such a manner that the current total mass of the agricultural tractor 20 appears in a country-specific measurement unit as a corresponding information text 116 on the graphical user interface 80. An acoustical or visual warning indicating an overload, in the present case, in the form of a warning sound produced by means of the acoustic signal generator 84 or a pictogram-like warning symbol 118 displayed on the graphical user interface 80, is also output if the current total mass exceeds a value that is permissible for the agricultural tractor 20.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A system for determining the axle load for an agricultural tractor, comprising:
   a wheel suspension device, arranged on a front axle of the agricultural tractor, the device including a hydraulic spring strut having a hydraulic cylinder and a hydraulic piston dividing the hydraulic cylinder into an annular space and a piston space;
   a first pressure sensor configured to detect a first working pressure, which is present in the annular space;
   a second pressure sensor configured to detect a second working pressure, which is present in the piston space; and
   a control device configured to calculate, on the basis of a pressure force difference derived from the first and second working pressures, a front axle load variable, which represents an axle load acting on the front axle.

2. The system of claim 1, wherein the front axle is pivotably suspended by a trailing arm and the control device takes a lever length specific to a trailing link into consideration in the calculation of the front axle load variable.

3. The system of claim 2, wherein the control device is configured to compare the calculated front axle load variable to a permissible operating value range, wherein the control device causes driver information to be output in the event of a deviation from the permissible operating value range.

4. The system of claim 3, wherein the control device, in order to output the driver information, triggers a user interface, is configured to Output one of an acoustic warning signal, a visual warning signal, and a corresponding information text indicating overloading or underloading of the front axle.

5. The system of claim 4, wherein the control device is configured to calculate a rear axle load variable, representing an axle load acting on a rear axle, by proceeding from a force effect appearing at a rear-end lifting mechanism due to a towed load.

6. The system of claim 5, wherein the control device is configured to determine a center of gravity position oriented in the longitudinal direction of the agricultural tractor on the basis of the calculated front axle load variable in conjunction with the calculated rear axle load variable.

7. The system of claim 6, wherein the control device is configured to determine the current total mass of the agricultural tractor on the basis of the calculated front axle load variable in conjunction with the calculated rear axle load variable.

8. The system of claim 7, wherein the control device is configured to trigger a user interface to display driver information indicating the current total mass of the agricultural tractor on the basis of the determined total axle load variable.

9. An agricultural tractor comprising:
   a wheel suspension device, arranged on a front axle of the agricultural tractor, the device including a hydraulic spring strut having a hydraulic cylinder and a hydraulic piston dividing the hydraulic cylinder into an annular space and a piston space;
   a first pressure sensor configured to detect a first working pressure, which is present in the annular space;
   a second pressure sensor configured to detect a second working pressure, which is present in the piston space; and
   a control device configured to calculate, on the basis of a pressure force difference derived from the first and second working pressures, a front axle load variable, which represents an axle load acting on the front axle.

10. The agricultural tractor of claim 9, further comprising:
    a chassis formed from a portion of the agricultural tractor; and
    a trailing arm having one end coupled to the chassis and a free end;
    wherein the front axle is pivotally suspended from the chassis via the wheel suspension device positioned at the free end of the trailing arm.

11. The agricultural tractor of claim 9, wherein the control device modifies the suspension device to regulate the level of the agricultural tractor relative to a ground surface.

12. The agricultural tractor of claim 9, wherein the wheel suspension device includes at least one accumulator.

13. The agricultural tractor of claim 9, wherein the control device alters a spring stiffness of the Wheel suspension device based on the front axle load variable.

14. The agricultural tractor of claim 9, further comprising:
    at least one front tire coupled to the wheel suspension device; and
    a central tire inflation system configured to alter the pressure of the at least one front tire;
    wherein, the control device alters the pressure of the at least one front tire via the central tire inflation system based on the front axle load variable.

* * * * *